United States Patent
Rinck et al.

(10) Patent No.: US 7,620,225 B2
(45) Date of Patent: Nov. 17, 2009

(54) METHOD FOR SIMPLE GEOMETRIC VISUALIZATION OF TUBULAR ANATOMICAL STRUCTURES

(75) Inventors: Daniel Rinck, Forchheim (DE); Michael Scheuering, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 728 days.

(21) Appl. No.: 11/220,664

(22) Filed: Sep. 8, 2005

(65) Prior Publication Data

US 2006/0062447 A1    Mar. 23, 2006

(30) Foreign Application Priority Data

Sep. 9, 2004    (DE) .................. 10 2004 043 695

(51) Int. Cl.
*G06K 9/00* (2006.01)
(52) U.S. Cl. .................. 382/128; 382/131; 382/154; 382/173
(58) Field of Classification Search .................. 382/100, 382/128–133, 154, 173, 254
See application file for complete search history.

(56) References Cited

U.S. PATENT DOCUMENTS

| | | | |
|---|---|---|---|
| 6,690,816 B2* | 2/2004 | Aylward et al. | 382/128 |
| 2001/0036303 A1* | 11/2001 | Maurincomme et al. | 382/132 |
| 2002/0181754 A1* | 12/2002 | Masumoto et al. | 382/131 |
| 2004/0184647 A1* | 9/2004 | Reeves et al. | 382/131 |

FOREIGN PATENT DOCUMENTS

| | | |
|---|---|---|
| WO | WO 03/021532 A2 | 3/2003 |
| WO | WO 03/063084 A2 | 7/2003 |

OTHER PUBLICATIONS

Dirk Selle et al. "Analysis of Vasculature for Liver Surgical Planning", IEEE Transactions on Medical Imaging, Nov. 2002, vol. 21. No. 11 pp. 1344-1357.*
D. Selle et al.: "Analysis of Vasculature for Liver Surgical Planning", in: IEEE Transactions on Medical Imaging, Nov. 2002, vol. 21, No. 11, S.1344-1357.
Translation of Japanese Office Action dated Nov. 10, 2008.

* cited by examiner

*Primary Examiner*—Matthew C Bella
*Assistant Examiner*—Eric Rush

(57) ABSTRACT

A method is disclosed for visualizing tubular anatomical structures from 3D recorded medical images, in particular coronary vessel structures, in the case of which segmented 3D image data of the tubular structure are firstly provided. The tubular structure represented by the segmented 3D image data is approximated via a multiplicity of mutually adjacent cylindrical and/or conically tapering elements. The mutually adjacent elements are subsequently displayed without the segmented 3D image data of the tubular structure. The method enables a simplified geometric display of the tubular structure that enables the person skilled in the art to make a simple interpretation of the structure, particularly in the case of transmission as a 2D image display.

11 Claims, 3 Drawing Sheets

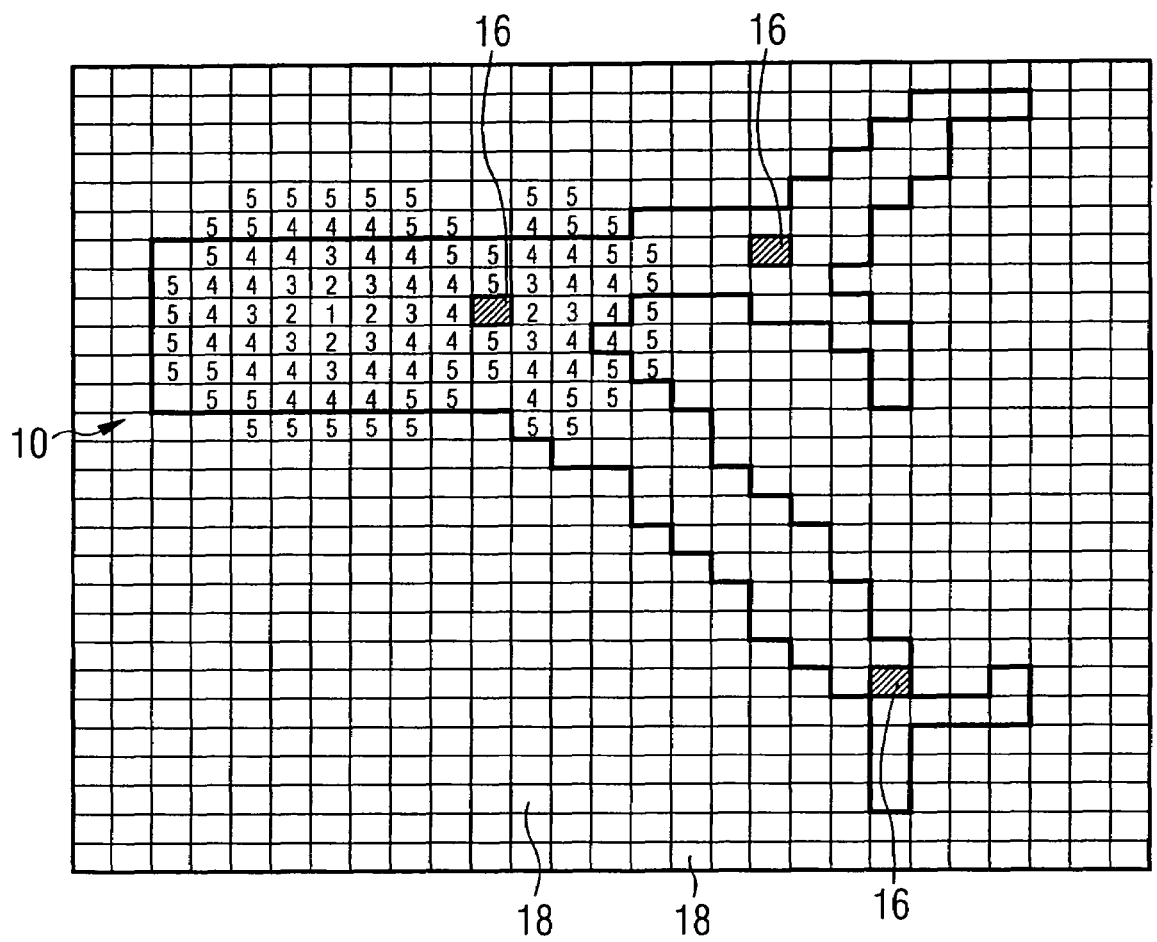

METHOD FOR SIMPLE GEOMETRIC VISUALIZATION OF TUBULAR ANATOMICAL STRUCTURES

The present application hereby claims priority under 35 U.S.C. §119 on German patent application number DE 10 2004 043 695.9 filed Sep. 9, 2004, the entire contents of which is hereby incorporated herein by reference.

FIELD

The present invention generally relates to a method for visualizing tubular anatomical structures from 3D recorded medical images, in particular coronary vessel structures and in particular in the case of which segmented 3D image data of the tubular structure are firstly provided.

BACKGROUND

Even with the aid of the currently available imaging techniques, it is a time-consuming and complex process to evaluate the coronary vessel system, for example in order to measure stenoses or to estimate the extent of calcified or non-calcified plaque deposits. Different visualization methods with the aid of which the recorded vessel structures can be displayed are made available with the aid of the high computing ability of modern image computers. Examples of this are MIP (Maximum Intensity Projection), VRT (Volume Rendering Technique), SSD (Shadow Surface Display) or else combinations of these visualization methods that support the radiologist during diagnosis. A quantitative analysis of the vessel structures requires a segmentation of the structures from the 2D or 3D recorded images on the basis of which it is possible to measure quantitative variables such as, for example, the length or the diameter/length ratio of a stenosis.

Above all, relaying the recorded data or the data derived from the recorded images to other specialists, for example a cardiologist, constitutes a particular problem. The visualization methods used to date such as, for example, interactive 3D-VRT leads to images that are difficult to interpret in the context of a reduction to a 2D display.

Despite the state of digitization techniques and electronic networking in hospitals, printing such images out onto paper is frequently still always required in order to transmit the examination results to appropriate specialists for providing a diagnosis. In these instances, the investigation result is therefore generally accompanied by a report in which the vessel tree is described in simple words, for example by specifying the distance of a lesion from a fixed landmark such as, for example, a branch point or an anatomical abnormality. However, even with an accompanying report, it is frequently difficult for the person skilled in the art to reconstruct the actual vessel structure correctly from the two-dimensional images.

SUMMARY

An object of at least one embodiment of the present invention resides in specifying a method for visualizing tubular anatomical structures such as, for example, the coronary vessel structure, which enables a simple interpretation of the tubular structure even given two-dimensional imaging.

An object may be achieved with the aid of a method, wherein advantageous refinements of the method can be gathered from the following description and the example embodiments.

The first step in at least one embodiment of the present method for visualizing tubular anatomical structures from 3D recorded medical images, in particular coronary vessel structures, is to provide segmented 3D image data on the tubular structure. These segmented 3D image data are preferably obtained from the 3D image data of a tomographic imaging of a body region in which the tubular structure is contained. The segmentation methods required for this purpose such as, for example, so-called region growing, constitute the prior art and so need not be explicitly examined at this juncture.

At least one embodiment of the present invention is distinguished above all in that the tubular structure represented by the segmented 3D image data is approximated by means of a multiplicity of mutually adjacent cylindrical and/or conically tapering geometric elements and, finally, the mutually adjacent elements are displayed without the segmented 3D image data of the tubular structure. This display can be done in two-dimensional or three-dimensional form. However, a two-dimensional display is preferred for relaying the display later.

The approximation of the tubular structure with the aid of the multiplicity of cylindrical and/or conically tapering elements is performed by automatic image processing of the segmented 3D image data. It is possible here to simulate the tubular structure by juxtaposing cylinders having different diameters, matched to the tubular structure and different lengths. Consequently, in the case of a coronary vessel structure the diameters of these fitted-in cylinders become smaller with increasing branching depth of the vessel structure. Instead of cylinders that respectively have a diameter remaining the same from the start to the end of the cylinder, it is also possible to make use for the approximation of the tubular structure of conical elements whose diameter decreases or increases linearly from the start to the end. Of course, it is also possible to combine the two types of element in order to achieve a matching tubular structure that is as accurate as possible.

The tubular structure is therefore displayed by way of simple geometric elements with the aid of at least one embodiment of the present method. A two-dimensional projection, for example a central or a parallel projection, of these juxtaposed elements can be transmitted without loss of information, including by fax, to a person skilled in the art who can easily gather the course of the fundamental tubular structure from this display. In the case of vessel structures, it is immediately possible to detect both bifurcations and instances of local narrowing, in particular stenoses, on the basis of the element displayed at this point and having the diameter reduced by comparison with adjacent elements. In a preferred refinement of at least one embodiment of the present method, such striking anatomical features are marked additionally in the display, preferably in a colored fashion. This can likewise be performed automatically by using an image processing algorithm to identify instances of local narrowing or bifurcations The display of the tubular structure provided with the aid of at least one embodiment of the present method makes it considerably easier for the person skilled in the art who has no access to interactive three-dimensional imaging of the 3D image data of the structure to evaluate and orientate inside the structure. Above all, the present method renders possible the simple transmission of a two-dimensional display of the structure without loss of information, and storage accompanied by a very low storage requirement. It is possible, nevertheless, for any property of the tubular structure that is essential to the diagnosis to be detected in the display.

In an advantageous refinement of at least one embodiment of the present method, the juxtaposed elements are projected onto a plane such that bifurcations that correspond to the same hierarchical stage lie respectively on a common ring, and bifurcations that correspond to different hierarchical stages lie on the plane in different rings which lie one inside another. The display of this projection is then performed together with the respective rings. The viewer therefore immediately sees in this display the respective hierarchy or bifurcation depth in which possible stenoses lie. This mode of display can convey to the viewer an impression as if the structure were to lie on the surface of a sphere starting from whose highest point it extends on the surface.

Of course, it is possible to use different image processing algorithms to approximate the tubular structure in the segmented 3D image data. An example of such an algorithm is to be gathered from the following exemplary embodiment. Fundamentally, such an image processing algorithm need only traverse the tubular structure and determine at numerous positions the centroid and diameter of the tubular structure in order to be able to fit in the corresponding elements at these points approximately to the course of the structure.

At least one embodiment of the present method is not restricted to the visualization of a vessel structure, but can be used generally to simulate and visualize tubular structures in the body of a patient. The basic segmented 3D image data can originate from recorded 3D images of the body region respectively involved, which have been recorded with the aid of the most varied imaging approaches, for example X-ray CT, X-ray angiography, magnetic resonance tomography, 3D ultrasound, PET or SPECT. The only condition for carrying out at least one embodiment of the present method is that the tubular structure can be suitably segmented from these 3D recorded images.

BRIEF DESCRIPTION OF THE DRAWINGS

The method is explained briefly below once again with the aid of example embodiments in conjunction with the drawings, in which:

FIG. 2 shows an example of a first step for approximating the vessel structure.

DETAILED DESCRIPTION OF THE EXAMPLE EMBODIMENTS

Figure 1A:
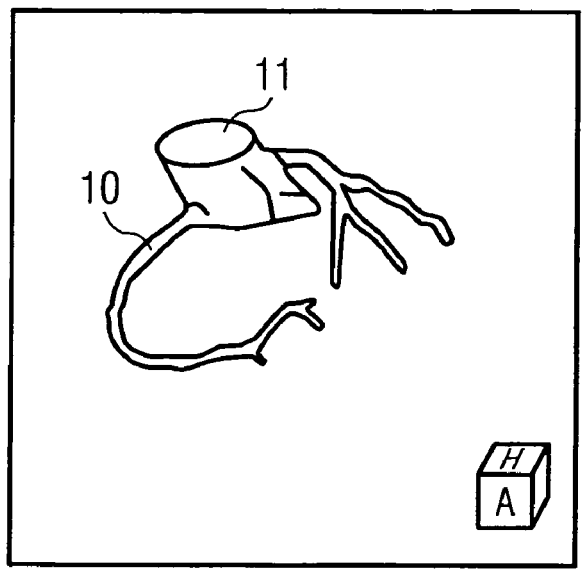
FIGS. 1A-C show an example of an image of a vessel tree, and two two-dimensional displays, derived therefrom, of the juxtaposed elements.
Figure 1B:
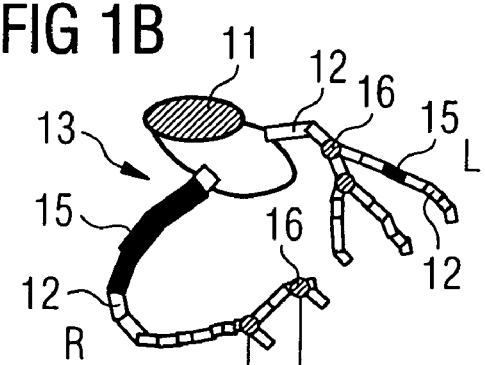
Figure 1C:
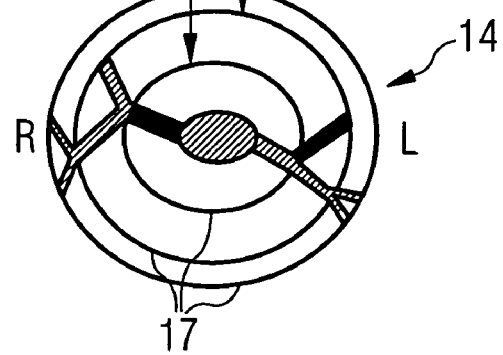

FIG. 1 shows in part image 1A a merely schematically indicated coronary vessel structure 10 such as can be displayed, for example as MIP on the monitor. This display is based on already segmented 3D image data of the vessel structure 10. Using at least one embodiment of the present method, these segmented 3D image data are now traversed starting from the aorta 11 in order to approximate the vessel structure 10 with the aid of a multiplicity of mutually adjacent cylindrical elements 12. Subsequently, these juxtaposed cylinders 12 are displayed without the fundamental 3D image data of the vessel structure 10. This is to be seen in part image 1B in a parallel projection 13 of these juxtaposed cylinders 12, in which the aorta 11 is additionally displayed as a segmented object. Striking anatomical features such as are caused, for example, by plaque deposits or stenoses are indicated in this display by marked elements 15. The bifurcation points 16 are marked in this example in a similar way by circles.

Another possibility for displaying these juxtaposed elements is to be seen in part image 1C, in which a number of concentric rings 17 are depicted which represent different bifurcation stages, that is to say, starting from the aorta 11, the first bifurcation, the second bifurcation, etc. The juxtaposed cylindrical elements 12 are projected in this case onto the plane of these rings in such a way that the bifurcations lie on the corresponding rings 17.

In both displays in accordance with at least one embodiment of the present method, the course and the increasing tapering of the vessel structure 10 can be recognized from different diameters of the projected cylindrical elements 12. Precisely the hierarchical display of the part image 1C enables the viewer to detect immediately the bifurcation depth at which special anatomical features are present.

FIG. 2 shows an example of a first step in carrying out at least one embodiment of the present method with the aid of a two-dimensional display for the purpose of simplification. In this display, an image section of a segmented vessel tree is to be seen as vessel structure 10, the individual rectangles representing the voxels 18 of the fundamental image. During the traversal of this vessel tree, a starting point is firstly set that is represented in FIG. 2 by the voxel 18 with the numeral 1. A small sphere that is subsequently enlarged in steps is firstly laid around this starting point.

This process is illustrated in FIG. 2 by the numerals 2-5 which respectively specify the distances of the periphery of the sphere from the starting point in units of individual voxels. The growing sphere can be implemented, for example, by way of so-called distance transformation method. After the sphere has reached a size at which it cuts the outer wall of the vessel structure 10 while forming two closed, at least approximately annular lines of intersection, the sphere is further enlarged in the present example by one or two steps. The lines of intersection then obtained define the initial and final surfaces of the cylinder fitted in at this point and having a diameter that corresponds to the diameter of the surface (surface of intersection) surrounded by at least one of the two lines of intersection.

In the present example, the two surfaces of intersection are of identical diameter. If the diameters of the two surfaces of intersection differ from one another, it is also possible to use a mean diameter for the formation of the cylinder. Furthermore, in this case it is also possible to fit in a conically tapering element whose initial and final diameters correspond to the diameters of the surfaces of intersection.

After the formation of this first cylinder, a new starting point is set approximately at the distance of the diameter of the cylinder from its end face and a sphere is pumped up anew in order to fit in the next cylinder or the next conically running element. When determining the lines of intersection, the centroid of the respective surface of intersection is also determined in order to set the starting point following thereupon as a function of this centroid. The detection of more than two surfaces of intersection is an indication of a bifurcation. This position is then marked as bifurcation point 16. This is also indicated in the illustration of FIG. 2.

The length of the individual cylindrical and/or conically tapering elements can be influenced by enlarging the number of the additional steps by which the sphere is pumped up further after formation of the two lines of intersection. The sphere is preferably enlarged further by one to three steps more after detection of the two lines of intersection. If no substantial change results in this region for the diameter of the surfaces of intersection, these surfaces of intersection achieved with the final size of the sphere are used for forming the elements. If a change is detected, the sphere can also be reduced again by one or two steps in order then to form the corresponding element.

Figure 3:
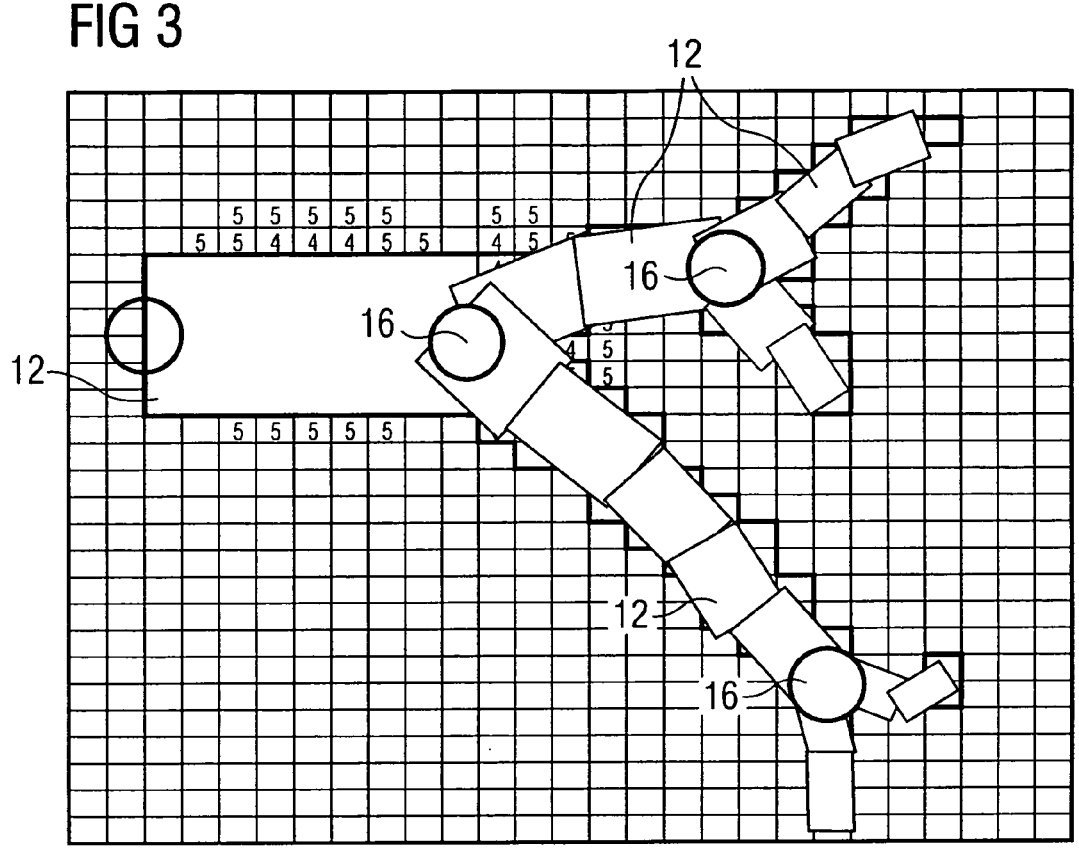
FIG. 3 shows an example of a structure from FIG. 2 approximated in accordance with FIG. 2 by way of cylindrical elements.

FIG. 3 shows the result of fitting in cylindrical elements 12 in accordance with the steps of FIG. 2. The individual, juxtaposed cylinders have ever smaller diameters in the case of increasing bifurcation of the structure. The bifurcation points 16 are marked by the circles in this illustration.

Figure 4:
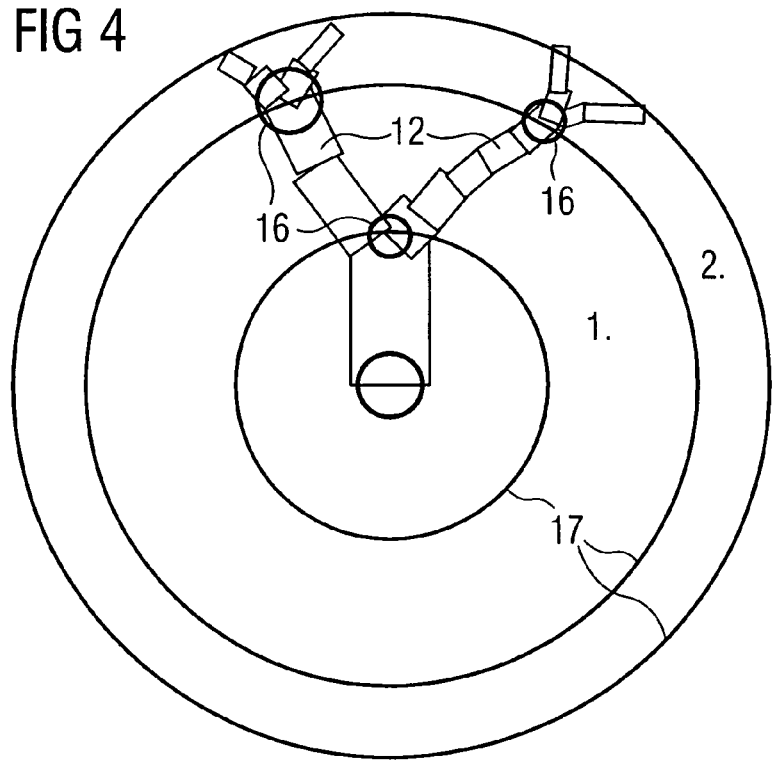
FIG. 4 shows an example of a hierarchical display of the juxtaposed cylinders that were obtained in accordance with the steps of FIGS. 2 and 3.

This representation of the vessel structure 10 can also be projected onto a plane, and displayed, in such a way that the bifurcation points 16 of different bifurcation stages in each case lie on different rings 17, and the bifurcation points 16 of identical bifurcation stages in each case lie on identical rings 17 in this plane. This may be seen with the aid of the illustration of FIG. 4. In this hierarchical chart diagram, the starting point of the structure lies at the center, and the subsequent bifurcation stages are in each case on the concentric rings 17 between which the juxtaposed cylindrical elements 12 are illustrated in accordance with their course projected onto this plane.

The above described embodiments of the method may further be embodied in a physical device, as would be understood by one of ordinary skill in the art, including via use of the disclosed and/or illustrated examples.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method to visualize for visualizing tubular anatomical structures from 3D recorded medical images, the method comprising:
   providing segmented 3D image data of a tubular structure;
   automatically approximating the tubular structure represented by the segmented 3D image data via a multiplicity of mutually adjacent at least one of cylindrical and conically tapering elements; and
   displaying the multiplicity of mutually adjacent at least one of cylindrical and conically tapering elements without the segmented 3D image data of the tubular structure, wherein automatically approximating the tubular structure is performed by:
      setting a starting point inside the tubular structure in the segmented 3D image data;
      forming a sphere around the starting point as center;
      enlarging the sphere by steps up to a final size at which the sphere forms two continuous lines of intersection with lateral walls of the structure that prescribe the start, end, and at least one mean diameter of the element formed at this point;
      setting a new starting point inside the tubular structure adjacent to the already formed element; and
      continuing the preceding steps until a prescribable part of the structure has been traversed, and wherein
   the multiplicity of mutually adjacent at least one of cylindrical and conically tapering elements are projected onto a plane in such a way that bifurcations of a different hierarchical stage lie on different rings, and bifurcations of an identical hierarchical stage lie respectively on an identical ring, and wherein the projection is displayed together with the rings.

2. The method of claim 1, wherein the multiplicity of mutually adjacent at least one of cylindrical and conically tapering elements are displayed in at least one two-dimensional projection.

3. The method of claim 1, wherein the stepwise enlargement of the sphere is performed in steps of individual voxels of the segmented 3D image data.

4. The method of claim 1, wherein anatomically striking sections are marked in the display of the mutually adjacent elements.

5. The method of claim 1, wherein the method is to visualize coronary vessel structures from 3D recorded medical images.

6. The method of claim 1, wherein anatomically striking sections are marked in colored fashion in the display of the multiplicity of mutually adjacent at least one of cylindrical and conically tapering elements.

7. The method of claim 2, wherein the provision of the segmented 3D image data comprises:
   providing 3D image data of a tomographic 3D imaging of a body region in which the tubular structure is formed; and
   segmenting the tubular structure from the 3D image data of the tomographic 3D imaging.

8. The method of claim 1, wherein the provision of the segmented 3D image data comprises:
   providing 3D image data of a tomographic 3D imaging of a body region in which the tubular structure is formed; and
   segmenting the tubular structure from the 3D Image data of the tomographic 3D imaging.

9. The method of claim 3, wherein the provision of the segmented 3D image data comprises:
   providing 3D image data of a tomographic 3D imaging of a body region in which the tubular structure is formed; and
   segmenting the tubular structure from the 3D image data of the tomographic 3D imaging.

10. A method to visualize tubular structures from segmented 3D medical image data, the method comprising:
   approximating a tubular structure represented by the segmented 3D image data via a multiplicity of mutually adjacent at least one of cylindrical and conically tapering elements; and
   displaying the multiplicity of mutually adjacent at least one of cylindrical and conically tapering elements without the segmented 3D image data of the tubular structure, wherein approximating the tubular structure is performed by:
      setting a starting point inside the tubular structure in the segmented 3D image data;
      forming a sphere around the starting point as center;
      enlarging the sphere by steps up to a final size at which the sphere forms two continuous lines of intersection with lateral walls of the structure that prescribe the start, end, and at least one mean diameter of the element formed at this point;
      setting a new starting point inside the tubular structure adjacent to the already formed element; and
      continuing the preceding steps until a prescribable part of the structure has been traversed, and wherein
   the multiplicity of mutually adjacent at least one of cylindrical and conically tapering elements are projected onto a plane in such a way that bifurcations of a different hierarchical stage lie on different rings, and bifurcations of an identical hierarchical stage lie respectively on an identical ring, and wherein the projection is displayed together with the rings.

11. The method of claim 10, wherein the multiplicity of mutually adjacent at least one of cylindrical and conically tapering elements are displayed in at least one two-dimensional projection.

* * * * *